US012047265B2

(12) United States Patent
Gebert et al.

(10) Patent No.: US 12,047,265 B2
(45) Date of Patent: Jul. 23, 2024

(54) SELECTIVE PACKET DUPLICATION OR ALTERNATIVE PACKET TRANSMISSION BASED ON SURVIVAL TIME

(71) Applicant: Nokia Technologies Oy, Espoo (FI)

(72) Inventors: Jens Gebert, Oberstenfeld (DE); Devaki Chandramouli, Plano, TX (US)

(73) Assignee: Nokia Technologies Oy, Espoo (FI)

( * ) Notice: Subject to any disclaimer, the term of this patent is extended or adjusted under 35 U.S.C. 154(b) by 398 days.

(21) Appl. No.: 17/617,764

(22) PCT Filed: Jul. 3, 2019

(86) PCT No.: PCT/US2019/040625
§ 371 (c)(1),
(2) Date: Dec. 9, 2021

(87) PCT Pub. No.: WO2021/002873
PCT Pub. Date: Jan. 7, 2021

(65) Prior Publication Data
US 2022/0263743 A1     Aug. 18, 2022

(51) Int. Cl.
*H04W 24/08*     (2009.01)
*H04L 43/062*    (2022.01)
(Continued)

(52) U.S. Cl.
CPC ........ *H04L 43/0847* (2013.01); *H04L 43/062* (2013.01); *H04L 43/0817* (2013.01); *H04W 24/08* (2013.01); *H04W 76/15* (2018.02)

(58) Field of Classification Search
CPC .............. H04L 43/0847; H04L 43/062; H04L 43/0817; H04L 1/0001; H04L 1/08;
(Continued)

(56) References Cited

U.S. PATENT DOCUMENTS

2018/0279168 A1* 9/2018 Jheng ...................... H04L 5/001
2018/0310202 A1* 10/2018 Löhr ............... H04W 36/00695
(Continued)

OTHER PUBLICATIONS

"3rd Generation Partnership Project; Technical Specification Group Services and System Aspects; System Architecture for the 5G System; Stage 2 (Release 16)", 3GPP TS 23.501 V16.0.2, Apr. 2019, pp. 1-317.
(Continued)

*Primary Examiner* — Hashim S Bhatti
*Assistant Examiner* — Hector Reyes
(74) *Attorney, Agent, or Firm* — Barta Jones, PLLC

(57) ABSTRACT

In some example embodiment, there may be provided an apparatus configured to at least: receive information including survival time and/or traffic pattern information indicative of deterministic traffic; determine, based on the received information, a packet handling type indicative of whether the deterministic traffic is to be carried in a selective packet duplication mode or an alternative packet transmission mode over at least two links; and perform, based on at least on the survival time, the indicated packet handling type to enable the deterministic traffic to be carried over the at least two links in the selective packet duplication mode or the alternative packet transmission mode.

20 Claims, 17 Drawing Sheets

(51) Int. Cl.
    *H04L 43/0817*     (2022.01)
    *H04L 43/0823*     (2022.01)
    *H04W 76/15*     (2018.01)

(58) Field of Classification Search
    CPC .......... H04L 1/22; H04L 45/24; H04W 24/08; H04W 28/04; H04W 76/15
    See application file for complete search history.

(56) References Cited

U.S. PATENT DOCUMENTS

2020/0170072 A1*   5/2020   Xiao ..................... H04L 5/0032
2020/0252330 A1*   8/2020   Wei .......................... H04L 1/08

OTHER PUBLICATIONS

"3rd Generation Partnership Project; Technical Specification Group Services and System Aspects; Study on enhancement of Ultra-Reliable Low-Latency Communication (URLLC) support in the 5G Core network (5GC) (Release 16)", 3GPP TR 23.725, V16.1.0, Mar. 2019, pp. 1-91.

"3rd Generation Partnership Project; Technical Specification Group Services and System Aspects; Study on enhancement of 5G System (5GS) for vertical and Local Area Network (LAN) services (Release 16)", 3GPP TR 23.734, V16.1.0, Mar. 2019, pp. 1-111.

"3rd Generation Partnership Project; Technical Specification Group Core Network and Terminals; Interface between the Control Plane and the User Plane Nodes; Stage 3 (Release 15)", 3GPP TS 29.244, V15.5.0, Mar. 2019, pp. 1-198.

"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340, V15.5.0, Mar. 2019, pp. 1-68.

"3rd Generation Partnership Project; Technical Specification Group Radio Access Network; NR; NR and NG-RAN Overall Description; Stage 2 (Release 15)", 3GPP TS 38.300, V15.5.0, Mar. 2019, pp. 1-97.

"3rd Generation Partnership Project; Technical Specification Group Radio Access Network; NR; Packet Data Convergence Protocol (PDCP) specification (Release 15)", 3GPP TS 38.323, V15.5.0, Mar. 2019, pp. 1-26.

"3rd Generation Partnership Project; Technical Specification Group Radio Access Network; NR; Radio Resource Control (RRC) protocol specification (Release 15)", 3GPP TS 38.331, V15.5.1, Apr. 2019, pp. 1-491.

"Further discussion on QoS and scheduling enhancements for TSN", 3GPP TSG-RAN WG2 Meeting #105, R2-1900636, Agenda: 11.7.2.2, Nokia, Feb. 25-Mar. 1, 2019, 8 pages.

"The Need for survival time in TSC Assistance Information", 3GPP TSG-SA WG2 Meeting #132, S2-1903640, Samsung, Apr. 8-12, 2019, 4 pages.

"3rd Generation Partnership Project; Technical Specification Group Services and System Aspects; Service requirements for cyber-physical control applications in vertical domains; Stage 1 (Release 16)", 3GPP TS 22.104, V16.0.0, Dec. 2018, pp. 1-55.

"3rd Generation Partnership Project; Technical Specification Group Radio Access Network; Study on Small Cell enhancements for E-UTRA and E-UTRAN; Higher layer aspects (Release 12)", 3GPP TR 36.842, V12.0.0, Dec. 2013, pp. 1-71.

"3rd Generation Partnership Project; Technical Specification Group Services and System Aspects; Procedures for the 5G System; Stage 2 (Release 15)", 3GPP TS 23.502, V15.0.0, Dec. 2017, pp. 1-258.

International Search Report and Written Opinion received for corresponding Patent Cooperation Treaty Application No. PCT/US2019/040625, dated Mar. 5, 2020, 14 pages.

"Survival time triggered PDCP duplication", 3GPP TSG-RAN WG2 Meeting #106, R2-1905752, Agenda: 11.7.4, CATT, May 13-17, 2019, 4 pages.

"104_40NR JIOT PDCP duplication report of email discussion, TP", D3GPP TSG-RAN WG2 #105, R2-1902362, Agenda: 11.7.4, Ericsson, Feb. 25-Mar. 1, 2019, 29 pages.

* cited by examiner

SELECTIVE PACKET DUPLICATION OR ALTERNATIVE PACKET TRANSMISSION BASED ON SURVIVAL TIME

RELATED APPLICATION

This application claims priority to PCT Application No. PCT/US2019/040625, filed on Jul. 3, 2019 the contents of which is incorporated herein by reference in its entirety.

FIELD

The subject matter described herein relates to time sensitive networking.

BACKGROUND

Time sensitive networks (TSN) may be used to support a variety of applications including applications such as ultra-reliable low-latency communications (URLLC), industrial verticals, and/or the like. In the case of industrial verticals and other mission critical applications, there may be some requirements that are relatively unique, such as certain requirements for low latency, deterministic data transmission, and high reliability, when compared to other 5G cellular services.

SUMMARY

In some example embodiment, there may be provided an apparatus configured to at least: receive information including survival time and/or traffic pattern information indicative of deterministic traffic; determine, based on the received information, a packet handling type indicative of whether the deterministic traffic is to be carried in a selective packet duplication mode or an alternative packet transmission mode over at least two links; and perform, based on at least on the survival time, the indicated packet handling type to enable the deterministic traffic to be carried over the at least two links in the selective packet duplication mode or the alternative packet transmission mode.

In some variations, one or more of the features disclosed herein including the following features can optionally be included in any feasible combination. The traffic pattern information may include time sensitive communication assistance information. The survival time may represent a time that an application at an end station operates after a loss of a message. The indicated packet handling type may be performed, when the survival time is equal to or exceeds a transfer interval over a cellular wireless network. The received information may be carried by a radio resource control message, a radio resource control reconfiguration message, a session establishment request, a packet forwarding control protocol message, and/or a protocol data unit session request. The apparatus may be further caused to at least determine, based on the survival time being equal to or greater than the transfer interval, that, for the deterministic traffic, at least one packet may be lost while satisfying a communication service availability for the deterministic traffic. The apparatus may be further caused to at least select, for the deterministic traffic being carried over the at least two links the selective packet duplication mode or the alternative packet transmission mode. The indicated packet handling type may be performed by at least configuring at least two links across a radio access network. The at least two links may be configured in accordance with carrier aggregation or dual-connectivity. The indicated packet handling type may be performed by at least configuring the at least two links as at least two tunnels over the N3 interface. The selective packet duplication mode may include selectively transmitting or receiving one or more duplicate packets over a second link, wherein the alternative packet transmission mode comprises alternating transmission or reception over the at least two links. The apparatus may comprise or comprised in a user equipment, base station, and/or a session management function. The deterministic traffic may include periodic traffic, time sensitive network traffic, and/or time sensitive communication traffic.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1A:
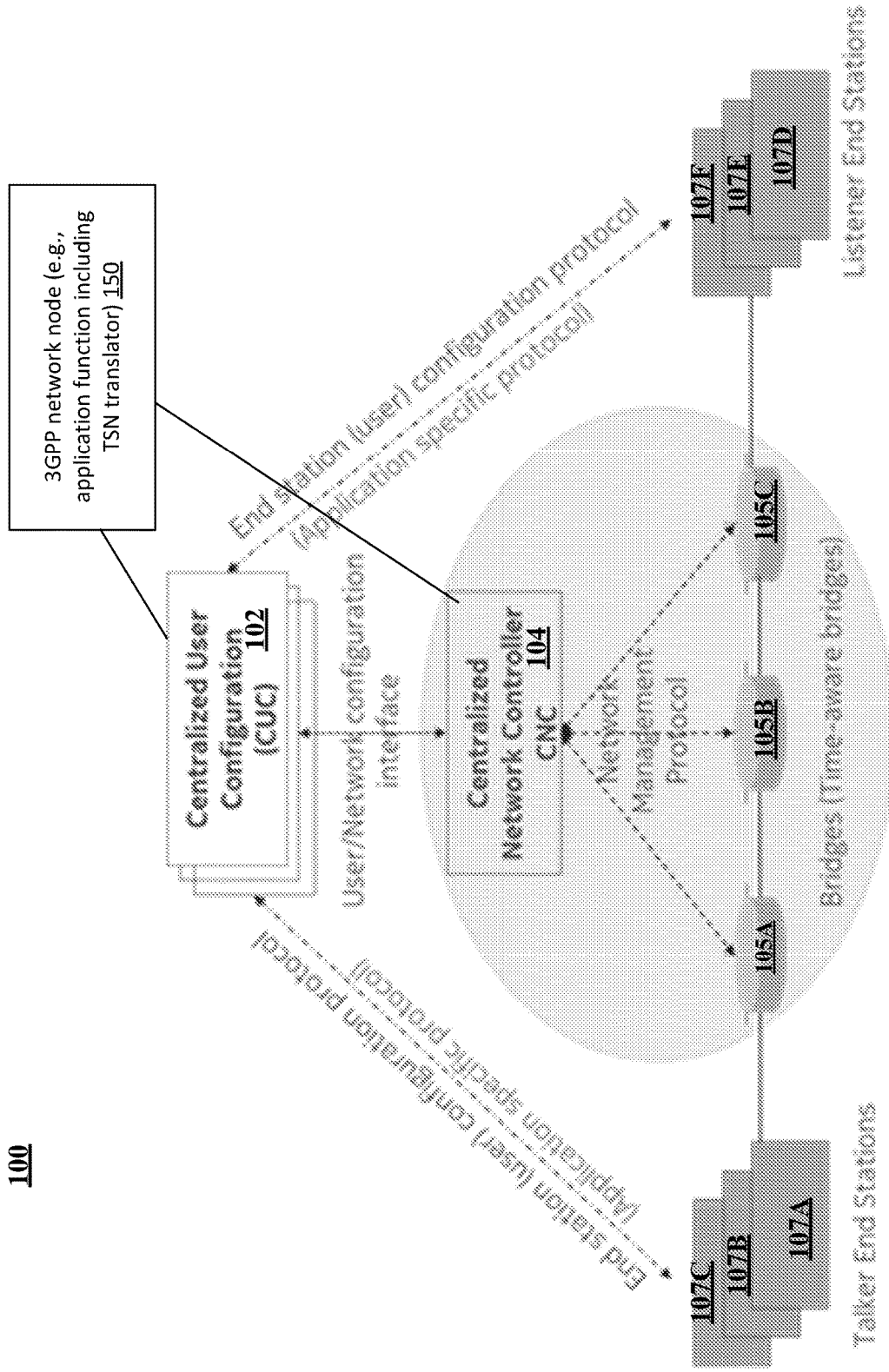
FIG. 1A depicts an example of a portion of a time sensitive network, in accordance with some example embodiments.

Like labels are used to refer to same or similar items in the drawings.

DETAILED DESCRIPTION

In some systems such as industrial networks including industrial internet of things (IIoT) or Industry 4.0 networks, 3GPP wireless technologies may be applied in addition to wired time sensitive networking (TSN) to provide additional flexibility with respect to mobility and to provide scalability with respect to the quantity of sensors, actuators, and/or the like which can be supported. For example, a TSN or other source of deterministic traffic may couple to a user equipment and use the 3GPP wireless network as a bridge to enable the traffic to traverse the 3GPP network to another device or network, such as another TSN network. As used herein, deterministic traffic refers to predictable, such as periodic traffic, an example of which is TSN traffic, which may be in accordance with IEEE 802.1 series standards, for example.

FIG. 1A depicts an example of a TSN network 100 configured in a fully centralized configuration model, although other configuration models may be implemented as well. In the TSN network example of FIG. 1A, the network may include a centralized user configuration (CUC) function 102, a centralized network controller (CNC) 104 function, one or more TSN bridges 105A-C, and one or more end stations 107A-D.

The CUC 102 may be configured in accordance with the one or more of the IEEE 802.1 series of TSN standards. The CUC may control the configuration of end stations 107A-F and/or applications at the end stations. For example, the CUC may interface with the CNC 104 to make requests to the CNC for deterministic, TSN communications (e.g., TSN flows) with specific requirements for those flows between end stations. The TSN flow may represent a time sensitive, deterministic stream of traffic between end stations. These TSN flows may have low delay and/or strict timing requirements for time sensitive networks. For example, a TSN flow between end stations may be used in an industrial control application (e.g., robot, etc.) requiring low delay and/or strict, deterministic timing between the end stations. The TSN flow may also have requirements for ultra-low reliability.

The CNC 104 may provide a proxy for the TSN bridges 105A-C and the corresponding interconnections, and as a proxy for control applications that require deterministic communication. The CNC may define the schedules, such as gate schedules, on which all TSN traffic is transmitted (or received) between the end stations including any intervening devices such as the TSN bridges 105A-C. For example, the schedules may define periodic transmission and/or reception.

The TSN bridges 105A-C may be implemented as Ethernet switches, for example. The TSN bridges are configured to transmit and/or receive TSN flows in accordance with a schedule, such as the gate schedule that gates traffic for transmission or reception. The TSN flow may be in the form of Ethernet frames transmitted and/or received on the schedule to meet the low delay and/or deterministic requirements of the TSN flow. For example, the talker end station 107A may transmit traffic based on the schedule (see, e.g., IEEE 802.1Qbv) to a bridge 105A, which may also receive and/or transmit traffic to another device based on a schedule.

The end stations 107A-F may be a source and/or a destination of a TSN flow. The end stations may include an application, such as an industrial application or other application requiring low delay and/or other time sensitive requirement for a deterministic traffic flow. The end stations may also be referred to as talkers and listeners. Talker end stations 107A-C refer to an end station which at a given instance is "talking," such as transmitting in accordance with TSN, while the listener end stations 107D-F refer to an end station which at a given instance is "listening." For example, each of the end stations may include circuitry to transmit (e.g., in the case of a "talker") and/or receive (e.g., in the case of a "listener") using for example, Time Sensitive Network (TSN) circuitry that enables communications over a TSN network in accordance with the IEEE suite of 802.1 series of standards.

Figure 1B:
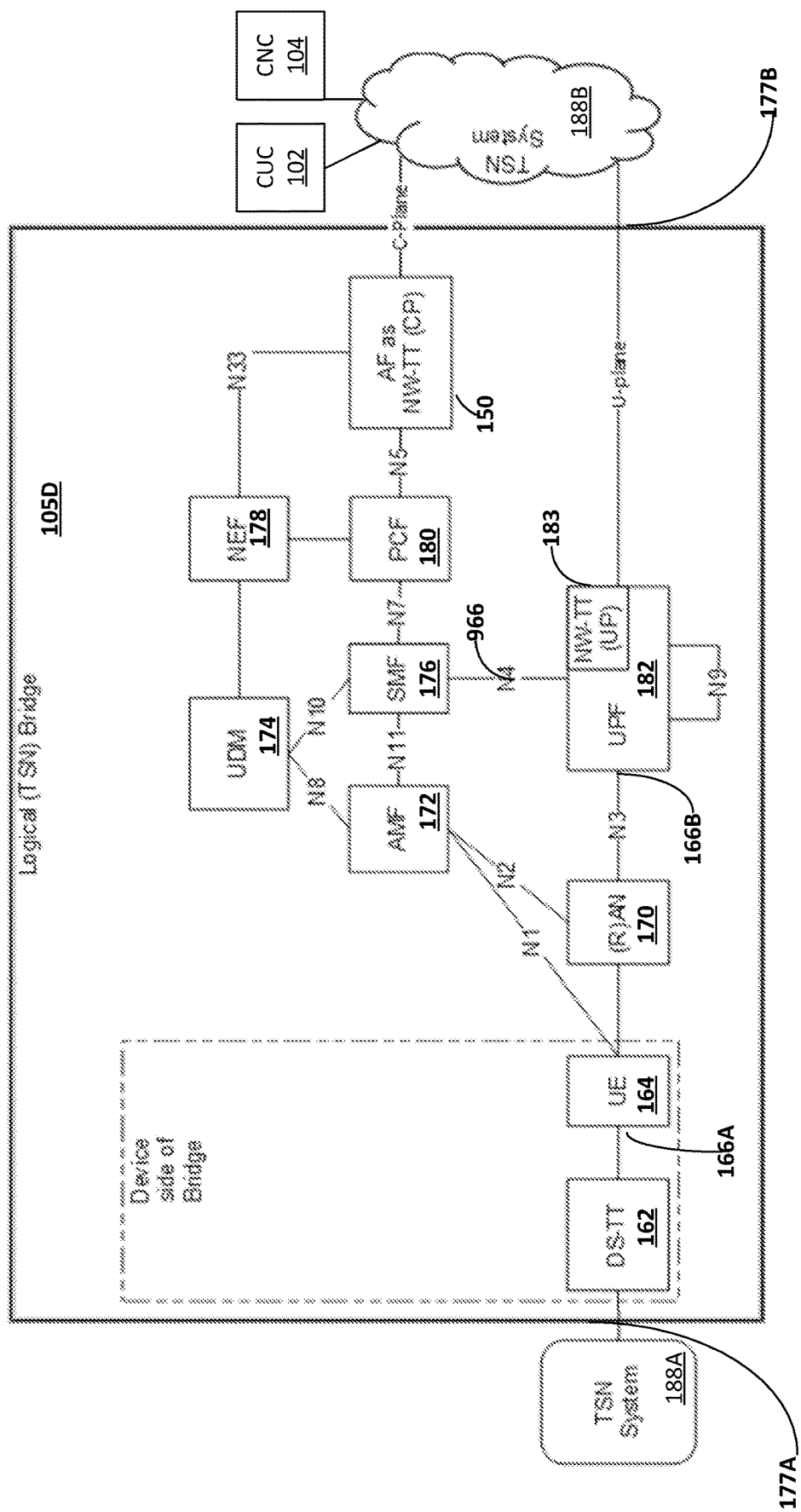
FIG. 1B depicts an example of a 3GPP bridge for a time sensitive network, in accordance with some example embodiments.

FIG. 1B depicts an example of a TSN bridge 105D, in accordance with some example embodiments. The TSN bridge 105D is also referred to herein as a 3GPP bridge 105D as the 3GPP bridge 105D is implemented as part of the cellular wireless system, such as the 5G system. In the example of FIG. 1B, the TSN system 188A may comprise the end station 107A, which may access the 3GPP bridge 105D via for example a wired connection to a user equipment (UE) 164 and a device side (DS) TSN translator (TT) 162. The user equipment 164 may establish a connection with a user plane function 182 (which also includes a network side (NW) TT) via a radio access network (RAN) 170, such as a 5G gNB or other type of base station. The UPF 182 including the NW TT 182 may provide a TSN compatible user plane data flow to TSN system 188B, which may comprise the end station 107D for example. Moreover, the UE 164 and/or RAN 170 may be configured with a schedule such as a gate schedule (which may be in accordance with IEEE 802.1Qbv). The gate schedule defines when traffic, such as burst, can be transmitted (or received) over the link in order to satisfy the low-latency and/or deterministic needs of TSN. The gate schedule may define the periodicity of the transmission and/or reception of a given device. The links (e.g., uplinks and/or downlinks) via the RAN represent the wireless part of the end-to-end connection between the TSN system 188A and another device or network, such as the TSN system 188B. The DS TT 162 and NW-TT 183 may translate TSN (TT) user plane data between the TSN system and the 3GPP system (e.g., via an ingress port 166A at the UE and an egress port 166B at the UPF 182. Although FIG. 1B depicts the NW TT 183 at the UPF 182, the NW TT may be located at other nodes as well. One or more nodes of the 3GPP bridge 105D may interface with the CUC 102 and/or CNC 104 to obtain information regarding the end station requirements for the TSN flow connection(s). For example, the AF 150 may interface to the TSN's CUC 102 and/or CNC 104 to obtain information regarding the TSN flows between TSN systems 188A-B (e.g., end stations). The 3GPP bridge 105D may include one or more radio access networks 170 (e.g., a radio access network served by a base station, gNB, eNB, and/or other nodes including core network nodes) to enable wireless connectivity for an end-to-end TSN flow between the TSN systems. Referring again to FIG. 1A, one or more of the bridges 105A-C may be implemented using the 3GPP bridge 105D of FIG. 1D to provide TSN support over the 5G wireless system. From the perspective of the end stations 107A and D for example, the 5G system's 3GPP bridge 105D appears like a more traditional wired TSN bridge.

FIG. 1B also depicts other network elements including an Access and Mobility Management Function (AMF) 172, a User Data Management (UDM) function 174, a Session Management Function (SMF) 176, a Policy Control Function (PCF) 180, a Network Exposure Function (NEF) 178, and an Application Function (AF) 150. In some implementations, the TSN system 188B may include a corresponding UE and/or DS-TT to mirror the UE 164 and DS-TT. When this is the case, the UPF 192 would couple to the UE and DS-TT, which in turn couples to a TSN end station.

In the case of time sensitive networks as well as other types of time sensitive communication (TSC) traffic (e.g., which is ultra-reliable, low latency, and deterministic), these requirements may be provided using Dual-Connectivity (DC) with packet duplication. For example, the UE 164 may establish two radio links to the RAN 170 carrying duplicative traffic to achieve the ultra-reliable requirements of TSN network. However, packet duplication over the 3GPP network doubles the traffic on the air interface, which is a limited resource.

For the deterministic traffic found in TSN and other types of time sensitive communications having ultra-reliable, low latency requirements, there is provided selective packet duplication over at least two links based on survival time, in accordance with some example embodiments.

For the deterministic traffic found in TSN and other types of time sensitive communications having ultra-reliable, low latency requirements, there is provided alternative packet transmission over at least two links based on the survival time, in accordance with some example embodiments.

Figure 1C:
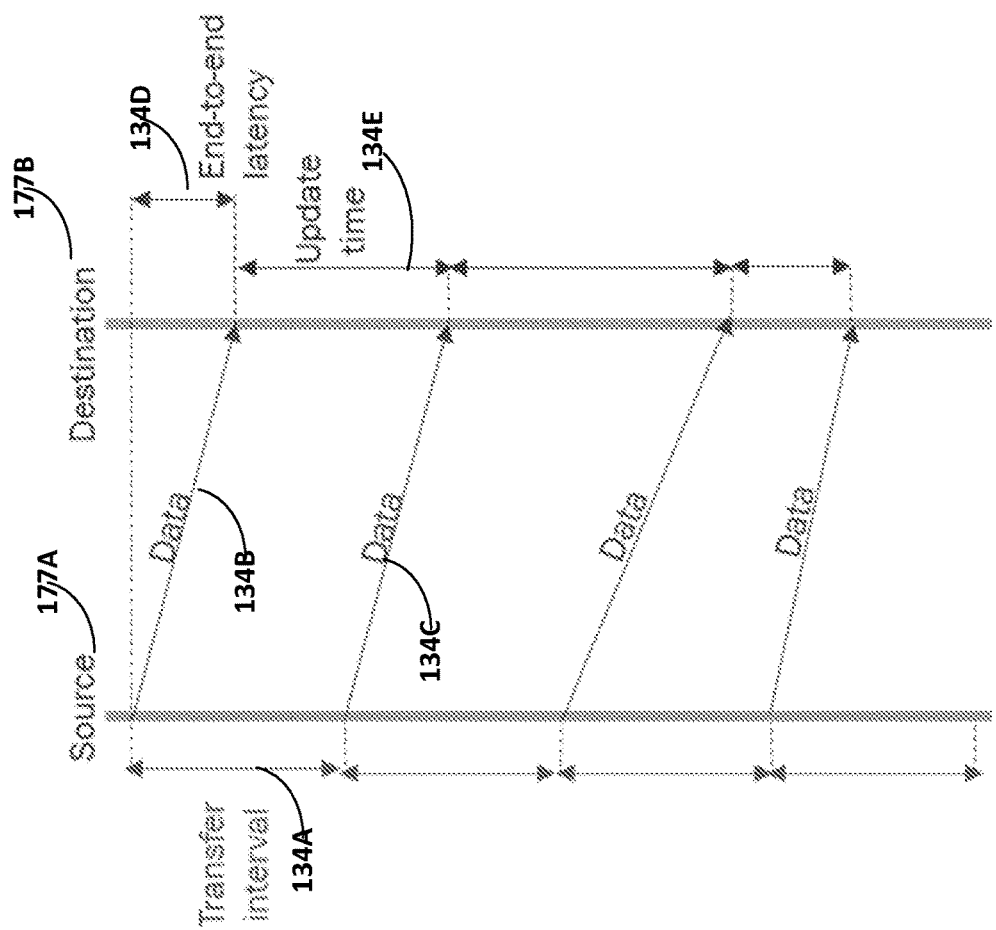
FIG. 1C depicts an example of a transfer interval, in accordance with some example embodiments.

When the survival time of a communication service is larger than a transfer interval value over the 3GPP network, certain packets can be lost while still satisfying the communication service availability requirements of the TSN. As such, for the periodic, deterministic traffic found in TSN and other types of time sensitive communications, full packet duplication over two links (which is typically the norm of TSN type traffic) may not be required. Instead, selective packet duplication or alternative packet transmission may be used, so long as the survival time is greater than the transfer interval over the 3GPP network. The phrase "survival time" refers to the time that an application at an end station consuming a communication service may continue without an anticipated message, such as one or more packets. For example, an application at an end station may survive (e.g., operate) after a loss of a message and a subsequent re-transmission of the message. The phrase "transfer interval" refers to the time difference between two consecutive transfers of data, such as one or more packets, from an application via the service interface(s) to 3GPP system. For example, when the survival time is equal to or exceeds a transfer interval over the wireless network, a packet may be lost while still maintaining the CSA requirements. FIG. 1C depicts user plane data transfer between a first interface 177A and a second interface 177B. The first interface 177A and the second interface 177B may correspond to the interfaces between the TSN system and the 3GPP system, such as 177A and 177B depicted at FIG. 1B. In the example of FIG. 1C, if the first message, such as data transfer 134B, is lost, a second message, such as data transfer 134C, may be re-transmitted to make up for that loss (e.g., due to a link failure, etc.). If the survival time of an application receiving data 134A-B is greater than the transfer interval 134A, the communication service availability requirements of the application may still be satisfied. At FIG. 1C, the transfer interface is a function of at least the end-to-end latency 134D between the interfaces 177A-B and the update time 134E (e.g., the time it takes to provide a retransmission of updated, replacement data for the loss of data 134B).

Figure 2:
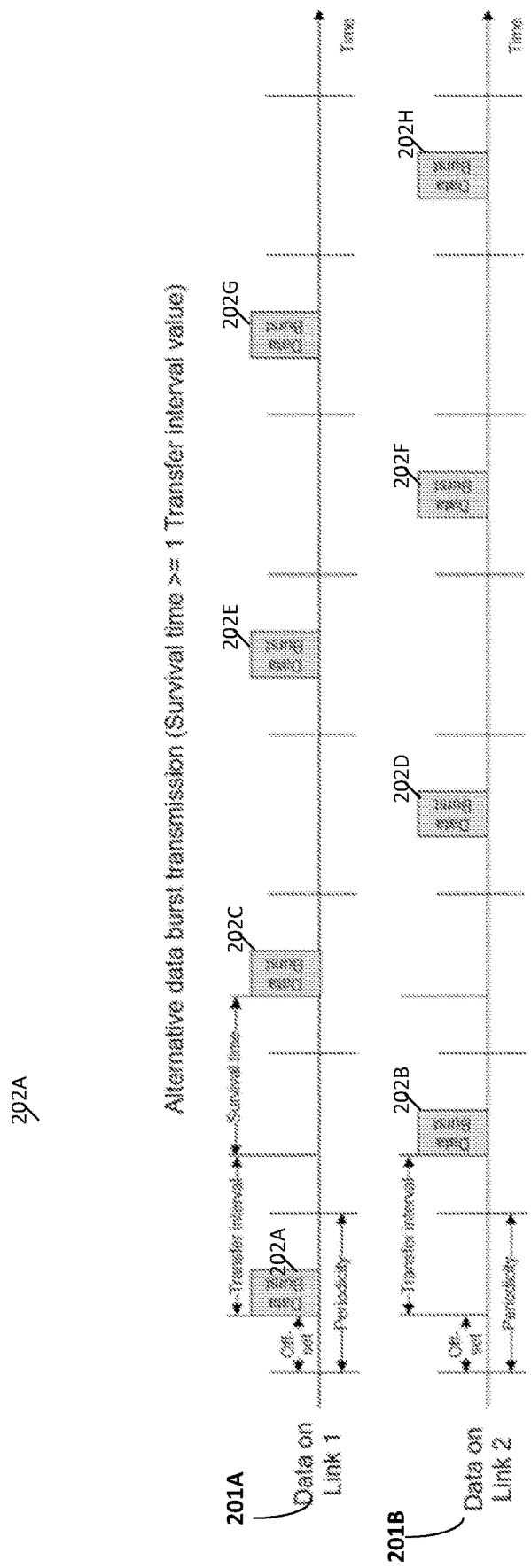
FIG. 2 depicts an example of alternative packet transmission based on the survival time, in accordance with some example embodiments.

FIG. 2 depicts an example of alternative packet transmission over at least two links based on the survival time, in accordance with some example embodiments. Although some of the examples disclosed herein refer to uplinks, the downlinks may be used as well.

In the example of FIG. 2, the TSN traffic is not duplicated, but rather a first data burst 202A is sent over a first uplink 201A while a second data burst 202B is sent over a second uplink 201B. In some example embodiments, the first uplink and second uplink are in dual connectivity (e.g., a UE coupled to a master base station and one or more secondary base stations). Alternatively or additionally, the first uplink and second uplink are configured for carrier aggregation (e.g., the UE couples to a single base station over two carrier frequencies). The data bursts refer to one or more packets transmitted (or received) based on a schedule such as gate schedule in accordance with IEEE 802.1Qbv. Thus, the data bursts (which may include one or more packets of TSN type traffic from a TSN system 188A) are alternatively sent by the UE 164 over the first uplink 201A via the RAN 170 and over the second uplink 201B via the RAN 170. Because the survival time is greater than the transfer interval over the 3GPP network, if a data burst, such as data burst, 202C is not received properly (e.g., loss, link failure, transmission errors, etc.) the communication service availability (CSA) requirements (which may be in accordance with 3GPP TS 22.104) of the TSN network can still be satisfied.

Figure 3:
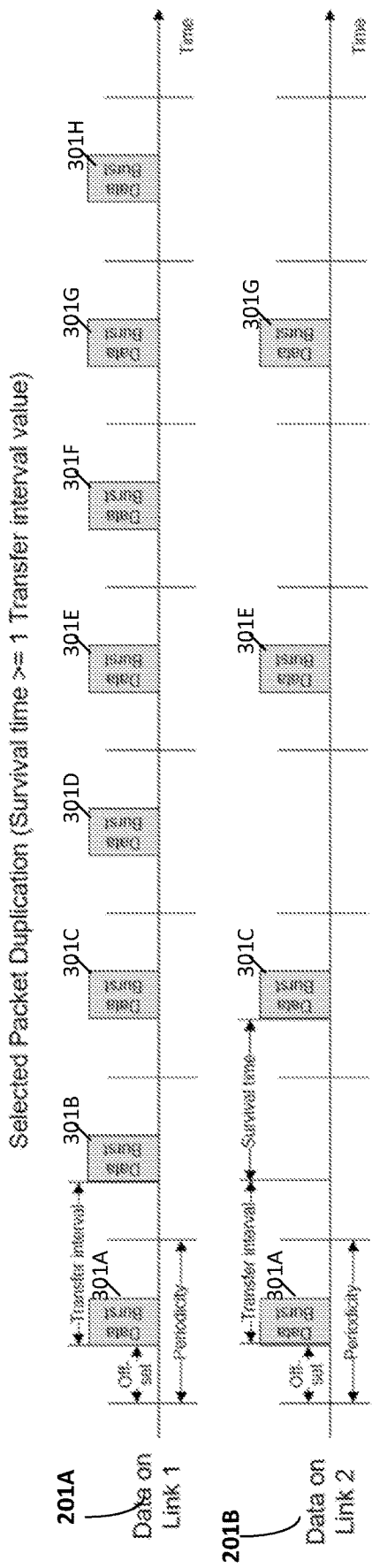
FIGS. 3-4 depict examples of selective packet duplication based on survival time, in accordance with some example embodiments.

FIG. 3 depicts an example of selective packet duplication over at least two links based on survival time, in accordance with some example embodiments. In the example of FIG. 3, a TSN traffic stream 301A-H from TSN system 188A is transmitted by UE 164 via the RAN 170 over a first uplink 201A, but the second uplink 201B selectively carries only a certain portion (e.g., percentage) of duplicate packets of the first uplink. For example, the first link carries burst 302A-H, while the second link carries, as duplicates, every second packet (e.g., 50%) of the first uplink's packets, so the second uplink carries 302A, 302C, 302E, 302G, and so forth. Even if one of the uplinks 201A or B has multiple transmission failures or fails completely, the CSA may still be satisfied by the packets on the other link given that the survival time is greater than the transfer interval over the 3GPP network. In the example of FIG. 3, the traffic resource usage is less than the more conventional full packet duplication used in TSN networks that require full duplication.

Figure 4:
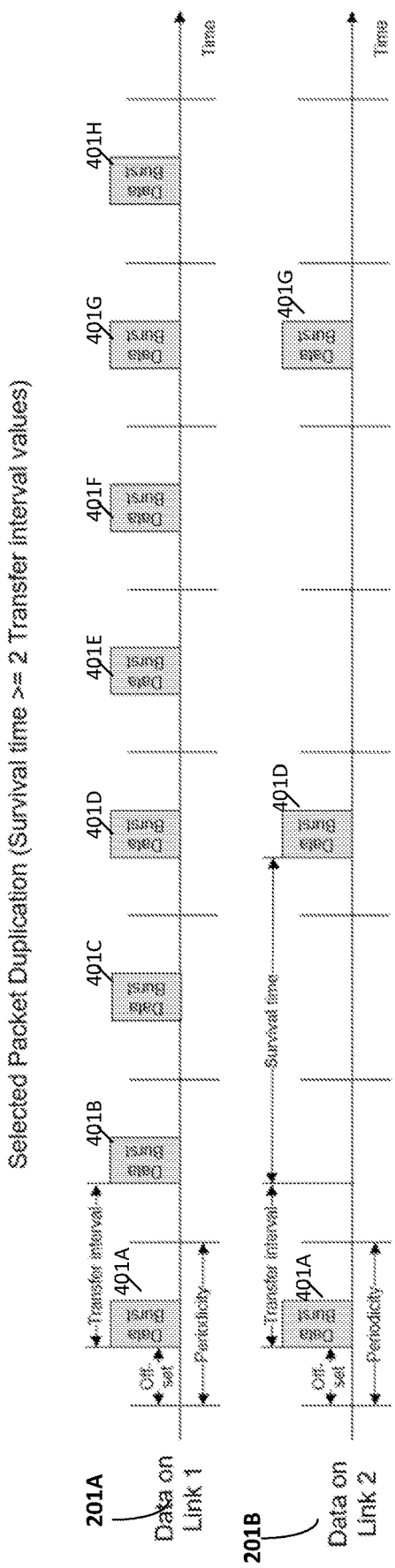

FIG. 4 depicts another example of selective packet duplication over at least two links based on survival time, in accordance with some example embodiments. Unlike the example of FIG. 3, FIG. 4 shows every third packet (e.g., 33%) being duplicated. Specifically, the first uplink 201A carries the data burst of the TSN stream as shown at 401A-H, while the second uplink 201B carries, as a duplicate, every third packet of the first link, so the second link carries 401A, 401D, 401G and so forth. Even if one of the links has multiple transmission failures or fails completely, the CSA may still be satisfied by the packets on the other link given that the survival time is greater than two transfer intervals over the 3GPP network. In the example of FIG. 4, the traffic usage is less than the more conventional full packet duplication used in TSN networks.

In some example embodiments, a network node, such as a base station (e.g., gNB), the SMF, and/or a UE, may decide, based on the survival time and the transfer interface, whether to provide 50 percent selective re-transmission as in FIG. 3 or 33% selective re-transmission as in FIG. 4. This decision may also take other information into account, such as link quality.

Although FIGS. 3-4 show selective duplication in the form of every second or third burst, other selectivity patterns (every $4^{th}$, $5^{th}$, $6^{th}$, etc.) may be used as well. In some example embodiments, a network node, such as a base station (e.g., gNB), SMF, or other node) may, based on the survival time as well as other factors (e.g., transfer interval, link quality, CSA requirements) change the traffic pattern from full duplication, alternative packet transmission, and selective packet duplication (which may include the selectivity pattern such as every second, third, etc. burst being duplicated on the second link).

Figure 5:
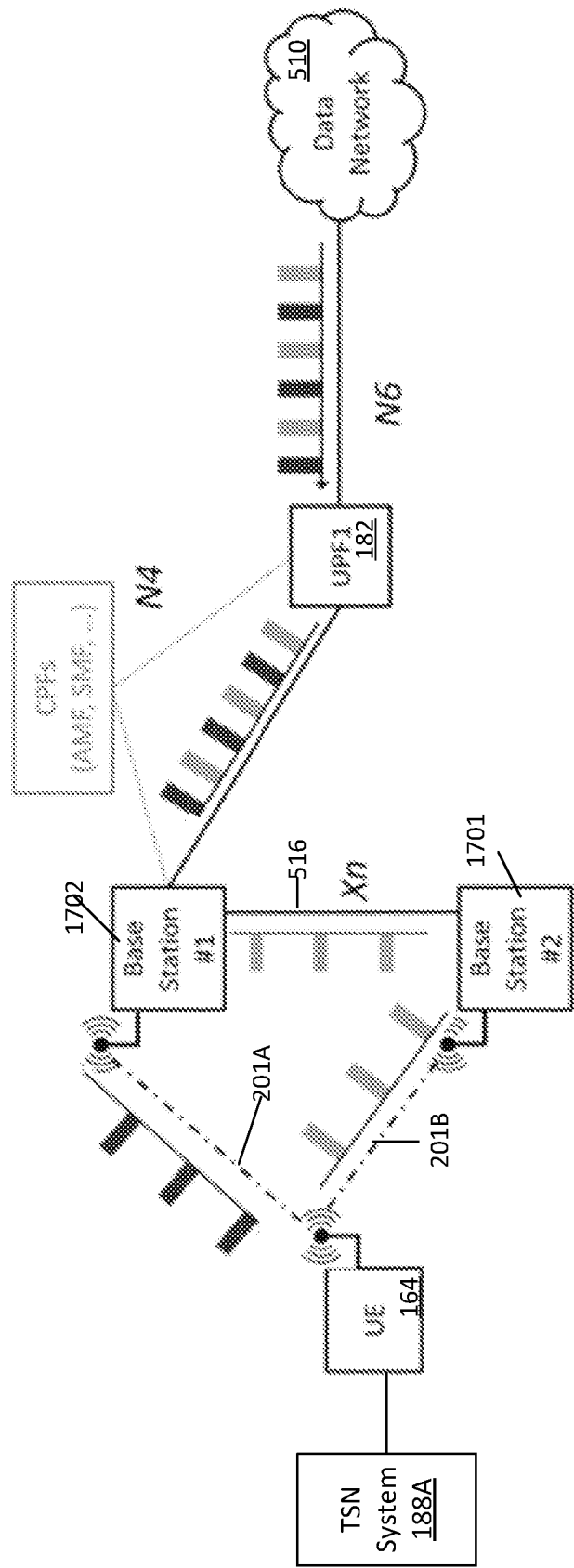
FIGS. 5-6 each depict examples of a wireless system configured to provide alternative packet transmission over at least two links based on the survival time, in accordance with some example embodiments.

FIG. 5 depicts another example of alternative packet transmission over at least two links based on the survival time, in accordance with some example embodiments.

FIG. 5 shows the TSN system 188A (e.g., one or more end stations) coupled to the UE 164, which provides a 3GPP bridge as noted above. The UE may establish at least two links as dual connectivity links to two different base stations, one serving as a master base station 1702 and another serving as a secondary base station 1704. In this dual connectivity configuration, the TSN traffic stream is alternatively transmitted via uplinks 201A and 201B to each of the base stations, rather than use full packet duplication (in which every packet is duplicated on the second link). The second base station 1701 forwards, via the Xn interface 516, the packets (which are received via link 201B) to the other base station 1702, which combines the packet bursts before being forwarded to the UPF 182. The UPF may then forward the TSN traffic stream to a data network 510, such as another device or network (e.g., a TSN network 188B).

Figure 6:
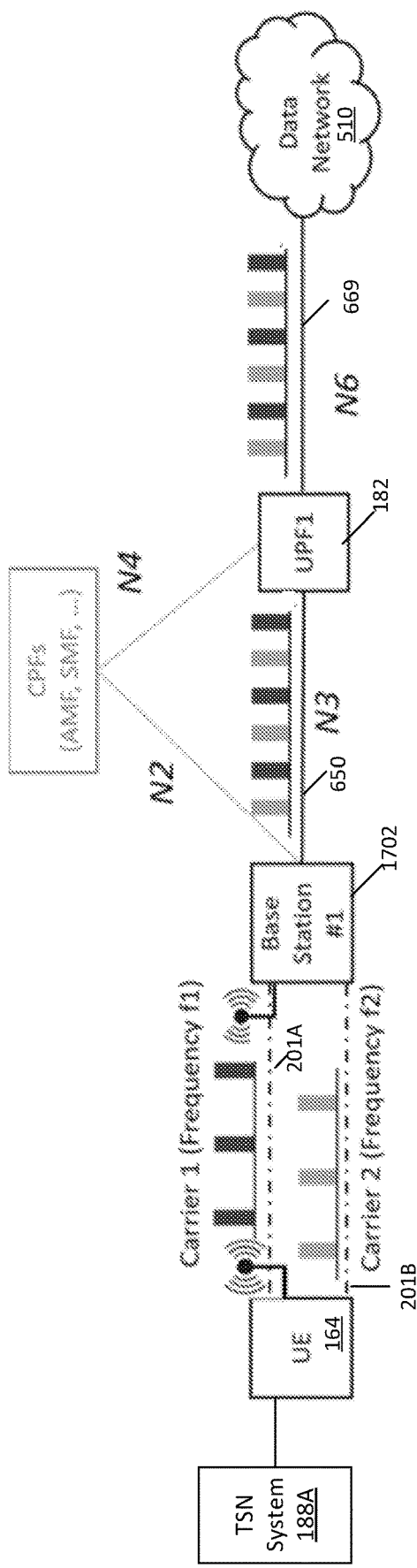

FIG. 6 depicts another example of alternative packet transmission over at least two links based on the survival time, in accordance with some example embodiments. Unlike FIG. 5, FIG. 6 shows carrier aggregation via two different carrier frequencies, f1 and f2, to a single base station 1702. The UE 164 may establish at least two uplinks via carrier 1 (at carrier frequency f2) 201A and carrier 2 201B (at carrier frequency f2) to a single base station 1702. In this configuration, the TSN traffic stream is alternatively transmitted via uplinks 201A and 201B, rather than use full packet duplication. The base station 1702 forwards, via the N3 interface 650, the packets to the UPF 182. The UPF may then forward the TSN traffic stream, via the N6 interface 669, to the data network 510.

Figure 7:
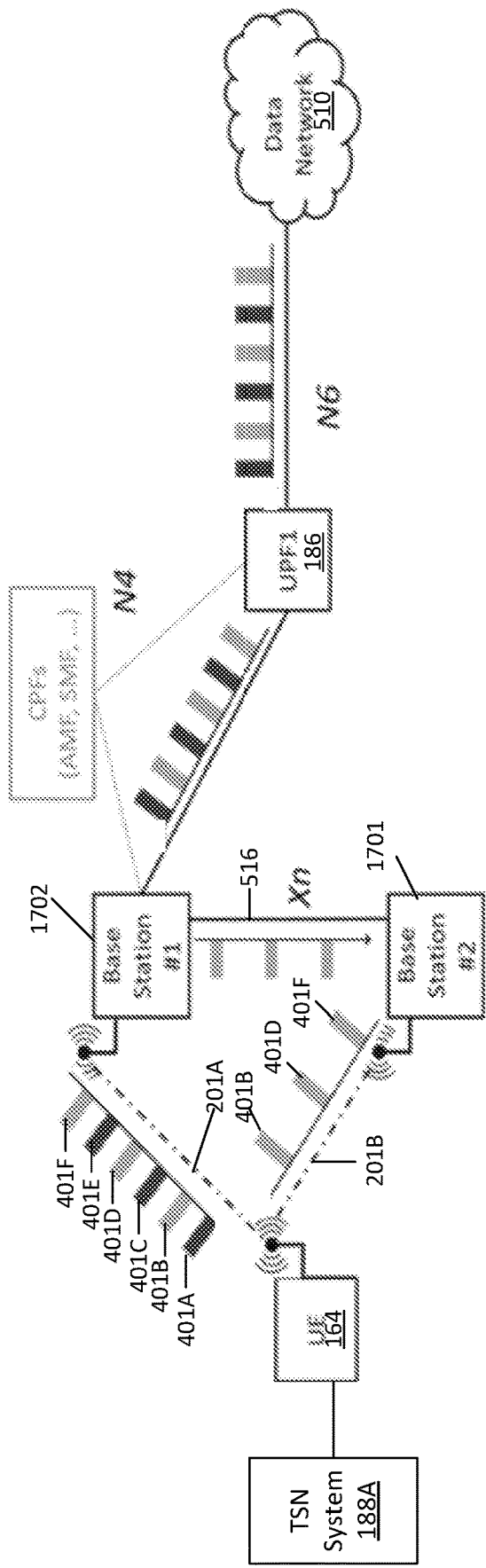
FIG. 7 depicts an example of a system configured to provide selective packet duplication over at least two links based on survival time, in accordance with some example embodiments.

FIG. 7 depicts another example of selective packet duplication over at least two links based on survival time, in accordance with some example embodiments. The UE 164 may transmit via uplink 201A to base station 1702 the complete TSN traffic stream 401A-F, and this transmission may be in accordance with a schedule such as a gate schedule as noted above. Rather than transmit a full duplicate of 401A-F, the UE transmits select packets 401 B, D, and F via the second uplink 201D to the base station 1701. The second base station 1701 forwards, via the Xn interface 516, the packet bursts to the other base station 1702, which combines the packet bursts before being forwarded to the UPF 182. The UPF may then forward the TSN traffic stream to the data network 510.

With respect to selective packet duplication or alternative packet transmission over the RAN, the packet data convergence protocol (PDCP, as defined in 3GPP TS 38.323) may need to take the different configurations into account. The PDCP may provide services to the radio resource control (RRC) and user plane upper layers. In the case of dual connectivity as shown in FIG. 7 for example, the PDCP may include a packet routing and packet duplication function configuration. For dual connectivity for example, the PDCP may also support the configuration of at least two modes based on survival time as follows: alternative packet transmission and/or selective packet duplication.

In accordance with some example embodiments, a node in the network, such as the RAN 170 (e.g., a gNB type base station and/or the like), SMF, and/or other node, may need and thus receive information about the traffic pattern for the deterministic traffic, such as periodic, TSC communication. This information about the traffic pattern may be found in the TSC Assistance Information (TSCAI) in accordance with 3GPP TS 23.501, section 5.27, for example. The TSC assistance information describes TSC traffic characteristics, and may include flow direction, periodicity (e.g., a gate schedule or time period between bursts), and burst arrival time at an ingress or egress point. The survival time information may be included as part of the TSCAI (although survival time may be part of the 3GPP QoS model). The TSCAI including survival time may be sent from the core network (e.g., the SMF via the AMF) to the RAN for RRC, which is control plane (CP) function in the RAN. The RRC may be responsible for configuring the protocol layers in both the network and the UE. This configuration may use the PDCP configuration based on the TSCAI including survival time information.

Figure 8:
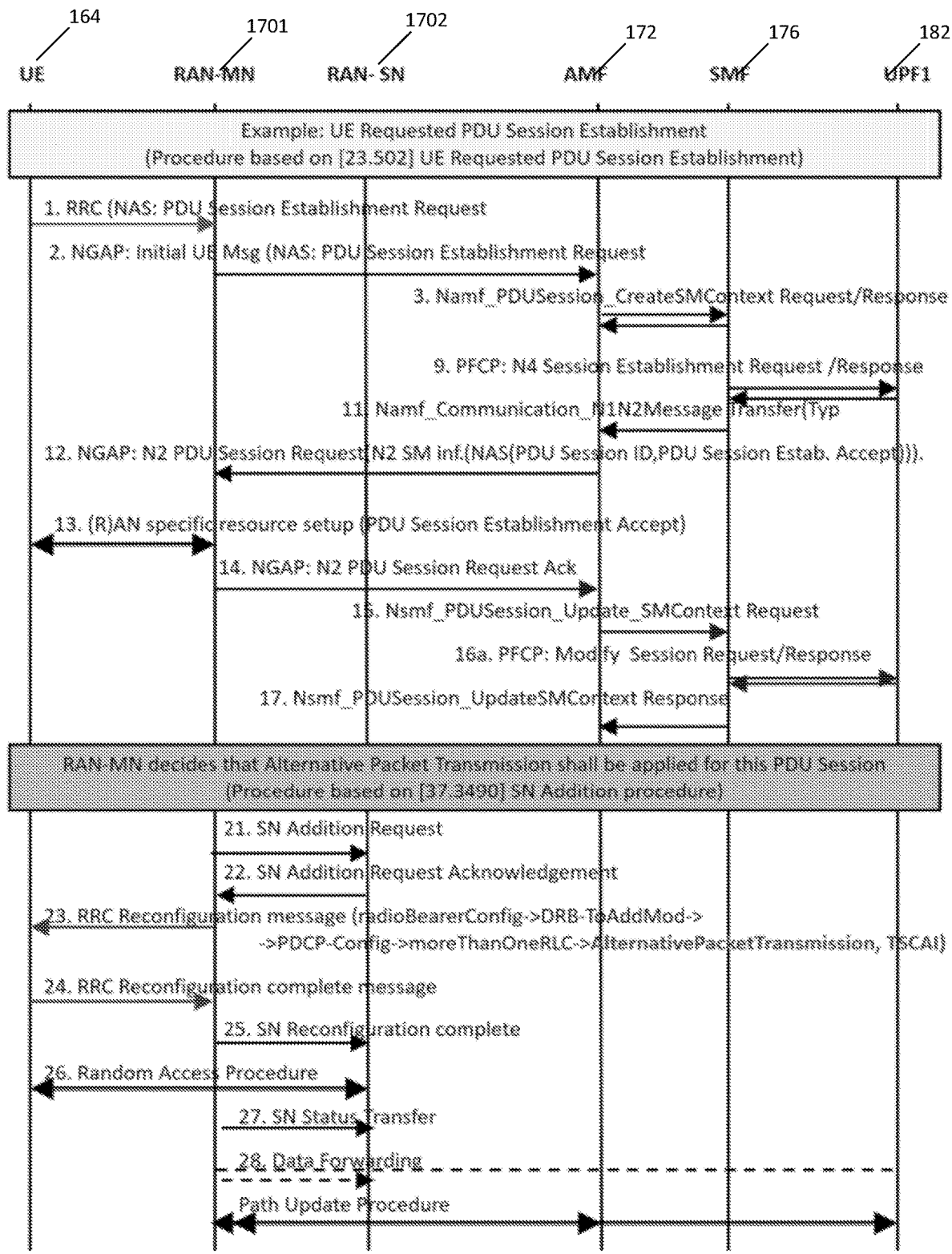
FIG. 8 depicts an example of a sequence diagram, in accordance with some example embodiments.

FIG. 8 depicts a sequence diagram for the alternative packet transmission, in accordance with some example embodiments.

At 23, the RAN 1701 may send a RRC reconfiguration message to the UE 164, in accordance with some example embodiments. This message may indicate to the UE that, for deterministic traffic, such as TSC traffic from TSN network 188A for example, the UE should use the alternative packet transmission mode. For example, the RRC message may include an indication of what type of traffic pattern to use for the TSC traffic. As shown in FIG. 8, the RRC configuration message lists "TSCAI" (which may include survival time information as noted) to indicate to the UE that deterministic traffic should be carried in the alternative packet transmission mode as indicated by the "Alternative Packet Transmission" included at the RRC message of 23. Although the RRC configuration message at 23 shows "Alternative Packet Transmission," this message may also indicate other modes, such as selective packet duplication or full packet duplication over the two links.

In some embodiments, the network, such as the RAN, SMF, or other node, may provide one or more rules to the UE. The rules may indicate to the UE that a given traffic pattern should be used based on survival time, link quality, and/or other factors. For example, a rule may indicate a traffic pattern such as alternative packet transmission mode, if the link quality is below a first threshold. By way of another example, a first rule may indicate that if the link quality is below a first threshold, the full duplication should be used, if the link quality is less than a second threshold, then selective packet duplication should be used, and if the link threshold is less than a third threshold, alternative packet transmission mode should be used. In any case, the decision to use the alternative packet transmission mode or selective packet duplication may be based on survival time (e.g., whether survival time exceeds the transfer interval as noted above).

To illustrate further, the PDCP-Config information element (which may be included in the "moreThanOneRLC" IE) may indicate for deterministic, TSC traffic whether the at least two links will be configured for a full packet duplication mode (in which the TSN traffic is duplicated over both dual connectivity links), alternative packet transmission mode, or selective packet duplication mode. In some example embodiments, the TSC traffic transmission modes may be indicated as shown in Table 1 below.

At 24, the UE 164 may respond to the RAN 1701 with a confirmation message to confirm that it has received and is configured with the indicated traffic pattern for the TSC traffic. In the example of FIG. 8, the response at 24 to the RAN/master base station 1701 confirms the alternative packet transmission mode. In this example, the UE 164 may then proceed to transmit in alternative packet transmission mode over the RAN as shown at FIG. 7, for example.

TABLE 1 pdcp-Redundancy with
{
   None,
   Duplication,
   AlternativeTransmission,
   PartialRedundancy_100_50
}.

Referring to Table 1, "Duplication" refers to full packet duplication over the at least two links. The phrase "AlternativeTransmission" refers to alternative packet transmission mode in which the packet data bursts are sent alternatively on the first and the second links as described above with respect to FIGS. 6 and 7. PartialRedundancy_100_50 refers to the selective packet duplication mode transmission of 100% of the packets on the first link and 50% of the packets (every $2^{nd}$ packet as shown at FIG. 3) on the second link. If for example other partial redundancy configurations are used, the indication may change, such as PartialRedundancy_100_33 (e.g., to indicate every $3^{rd}$ data burst as shown at FIG. 4), PartialRedundancy_100_25 (e.g., to indicate every $4^{th}$ data burst), and the like.

Although FIG. 8 depicts the RRC configuration message at 23 indicating to the UE to use alternative packet transmission, the RRC configuration message may indicate other modes, such as selective packet duplication or full duplication.

Figure 9:
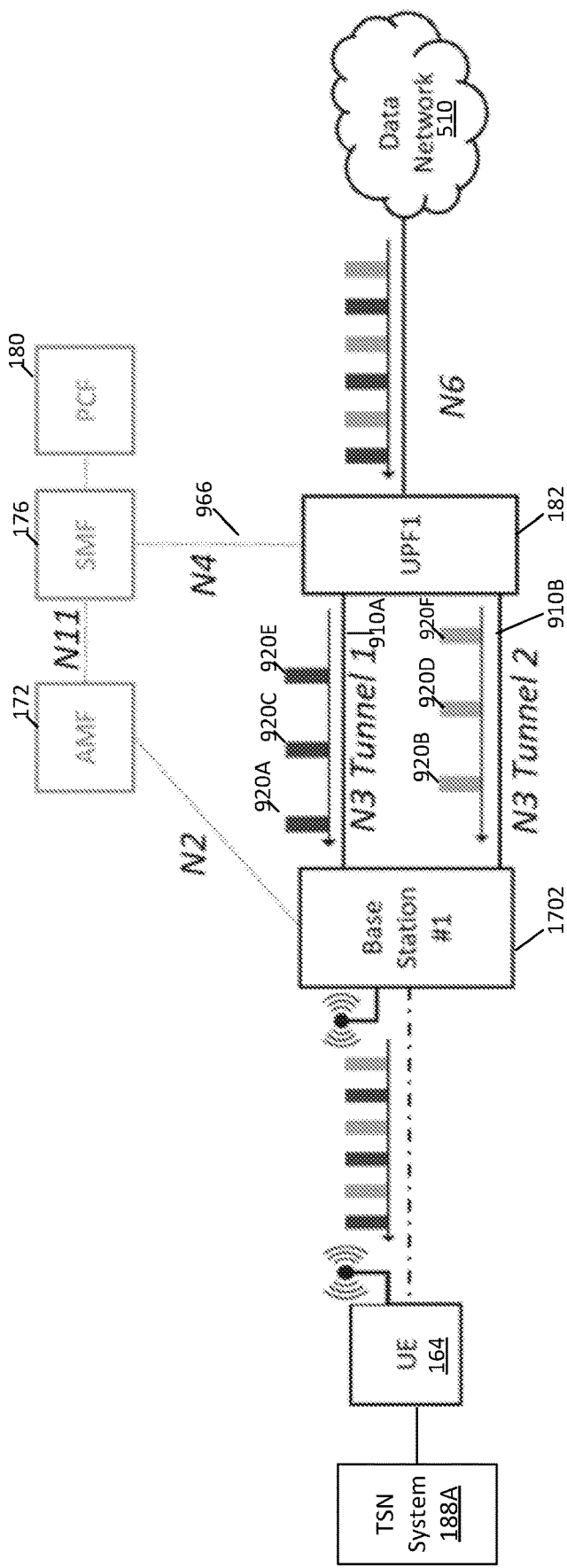
FIG. 9 depicts an example of alternative packet transmission in the core network, in accordance with some example embodiments.

FIG. 9 depicts an example of the alternative packet transmission mode in the core network using two N3 tunnels between the UPF 182 and a single RAN node such as base station 1702. In the example of FIG. 9, the TSN traffic is not fully duplicated over the first N3 tunnel 910A and the second N3 tunnel 910B, but rather a first data burst 920A is sent over the first tunnel 910A, while a second data burst 910B is sent over the second tunnel 920B, and so forth in an alternating manner. The transmission and reception over the tunnels 910A-B may be in accordance with a schedule, such as a gate schedule in accordance with IEEE 802.1Qbv. Although FIG. 9 depicts the at least two N3 tunnels configured for alternative packet transmission, these tunnels may also be configured in the selective packet duplication mode or full duplication mode as well.

Figure 10:
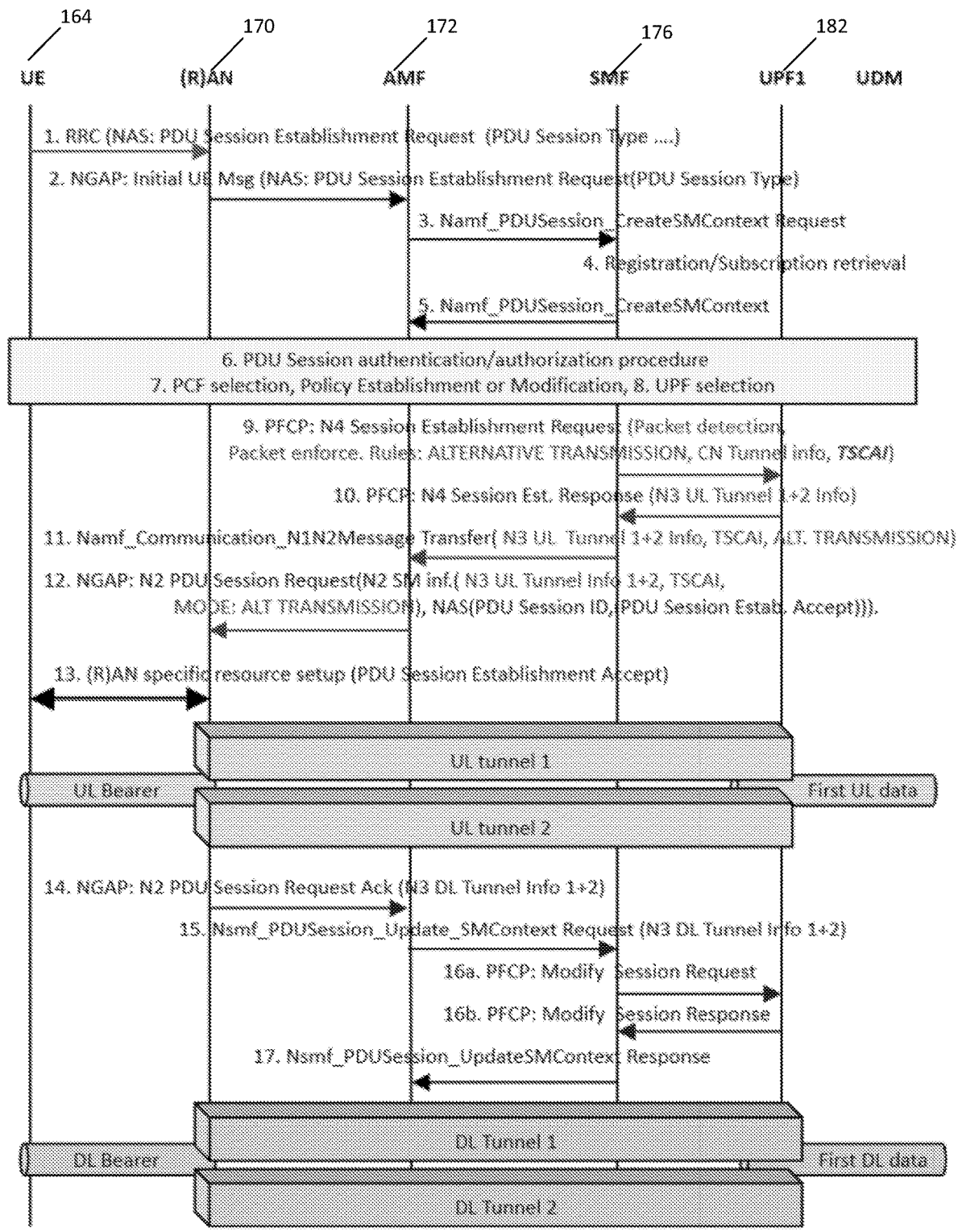
FIG. 10 depicts another example of a sequence diagram, in accordance with some example embodiments.

FIG. 10 depicts a sequence diagram for the alternative packet transmission mode example of FIG. 9, although the sequence at FIG. 10 may also be used to establish the selective packet duplication over the tunnels 910A-B as well.

In the example of FIG. 10, the UE 164 may have requested PDU session establishment, and the SMF has knowledge about the TSCAI including survival time. In the FIG. 10 example, the SMF 176 may decide that at least two N3 tunnels 910A-B will be used to carry the TSC traffic alternative packet transmission mode, in accordance with some example embodiments.

In the case of a downlink for example, the SMF 176 may provide to the UPF 182 a message carrying information over an interface, such as the N4 interface 966, using, for example, the packet forwarding control protocol (PFCP, see, e.g., 3GPP TS 29.244). In accordance with some example embodiments, this message may be used to establish the N3 tunnels 910A-B configured to have the alternative data transmission pattern, although the message may also configure the establishment of the selective packet duplication mode as well.

Information on a TSN traffic pattern and/or survival time may be sent in the centralized TSN deployment model from the CNC 104 Alternatively or additionally, the information about the traffic pattern may be sent from the TSN system 188A to the DS-TT 162 or the TSN System 188b to the AF 150. Alternatively or additionally, the information about the traffic pattern may be sent from the TSN system 188A to SMF 176. Alternatively or additionally, the traffic pattern information may be included in an RRC message in the session establishment request (see, e.g., message 1 at FIG. 10). The traffic pattern information may also be obtained via a PDU session modification, in which the UE or network requests a PDU session modification. In the case of the network requested PDU session modification, the CNC may sends the information via the AF 150 via the PCF to the SMF, for example.

At 9, the SMF 176 may send, via the N4 966, to the UPF 182 a message, in accordance with some example embodiments. This message may comprise a PFCP message sent, as noted, over the N4 interface to provide a session establishment request. In some example embodiments, the message sent at 9 may include an indication that the traffic over the N3 tunnels 910A-B is deterministic traffic, such as TSN traffic. In the example of FIG. 10, the TSCAI indication may indicate to the UPF that the traffic is deterministic traffic. Moreover, the TSCAI may include an indication of the survival time. The message sent at 9 may also indicate the mode of traffic transmission over the N3 tunnels, such as whether the TSC traffic carried is in a full packet duplication mode, a single transmission mode (e.g., without packet duplication), an alternative data transmission pattern, or a selective transmission mode. The message at 9 may include additional information such as packet detection information, packet enforcement rules, core network tunnel information as well as other information.

At 10, the UPF may respond, via the N4 interface, to the SMF 176, in accordance with some example embodiments. The response may be in the form of a PFCP message. Moreover, the response may include tunnel information for the N3 tunnels (e.g., tunnel information (UL tunnel 1+2) including tunnel endpoint IDs allocated by the UPF).

In the case of the uplink, the SMF 176 may provide a message, at 11, towards the AMF 172. This message may comprise an Namf_Communication_N1N2Message Transfer, which includes the N3 tunnel information, the TSCAI (which as noted may include survival time), and the mode of transmission (which in this example is alternative transmission mode over each of the N3 tunnels 910A-B).

At 12, the AMF may send towards the RAN 170 a PDU session request including N3 UL tunnel 1+2 info, the TSCAI, and the mode of transmission (which in this example is alternative transmission mode).

Figure 11A:
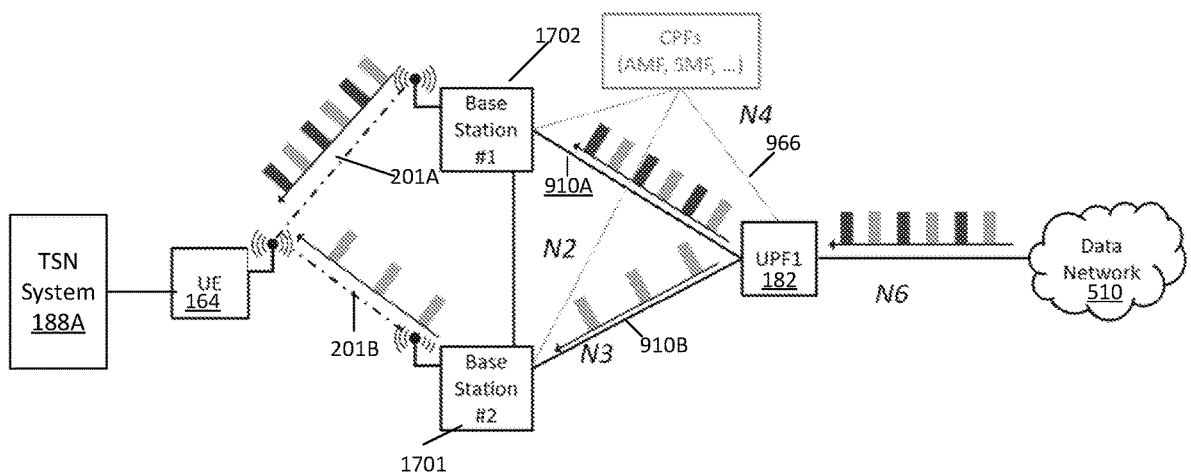
FIG. 11A depict example of a system configured to provide selective packet duplication in the core network and the radio access network, in accordance with some example embodiments.

FIG. 11A depicts another example of a system showing the core network and the RAN using selective packet duplication in the core network, such as over the N3 tunnels 910A-B. In some example embodiments, the SMF may determine whether the RAN and the core network should use selective packet duplication based on the survival time being greater than the transfer interval.

Figure 11B:
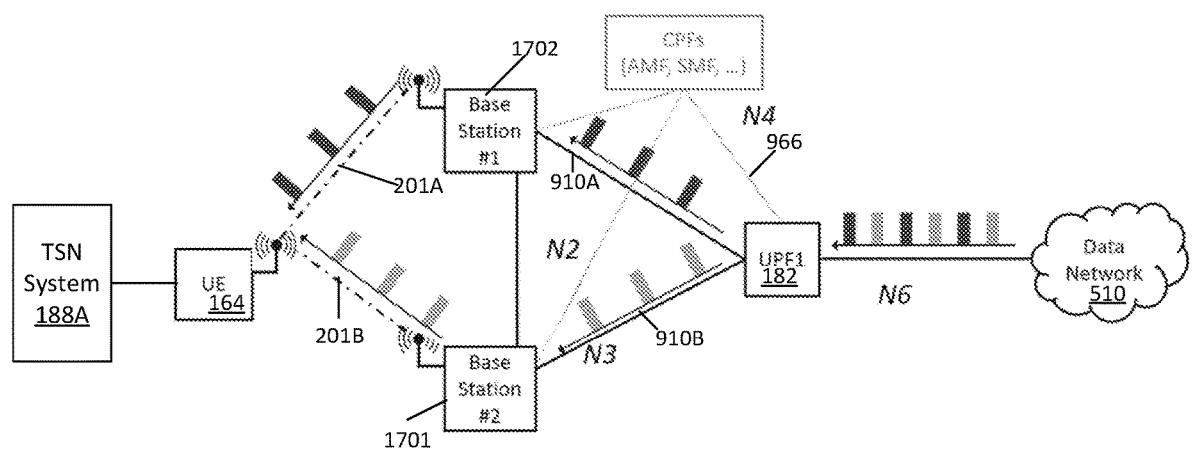
FIG. 11B depict example of a system configured to provide alternative packet transmission in the core network and the radio access network, in accordance with some example embodiments.

FIG. 11B depicts another example showing the core network and the RAN using alternative packet transmission mode in the core network, such as over the N3 tunnels 910A-B. In some example embodiments, the SMF may determine whether the RAN and the core network should use alternative packet transmission mode based on the survival time being greater than the transfer interval. Furthermore, the TSC traffic may be carried using selective duplication mode and/or alternative data transmission mode in over other portions of the system as well including the TSC end hosts, TSC bridges, the data network, and/or the like.

Figure 12:
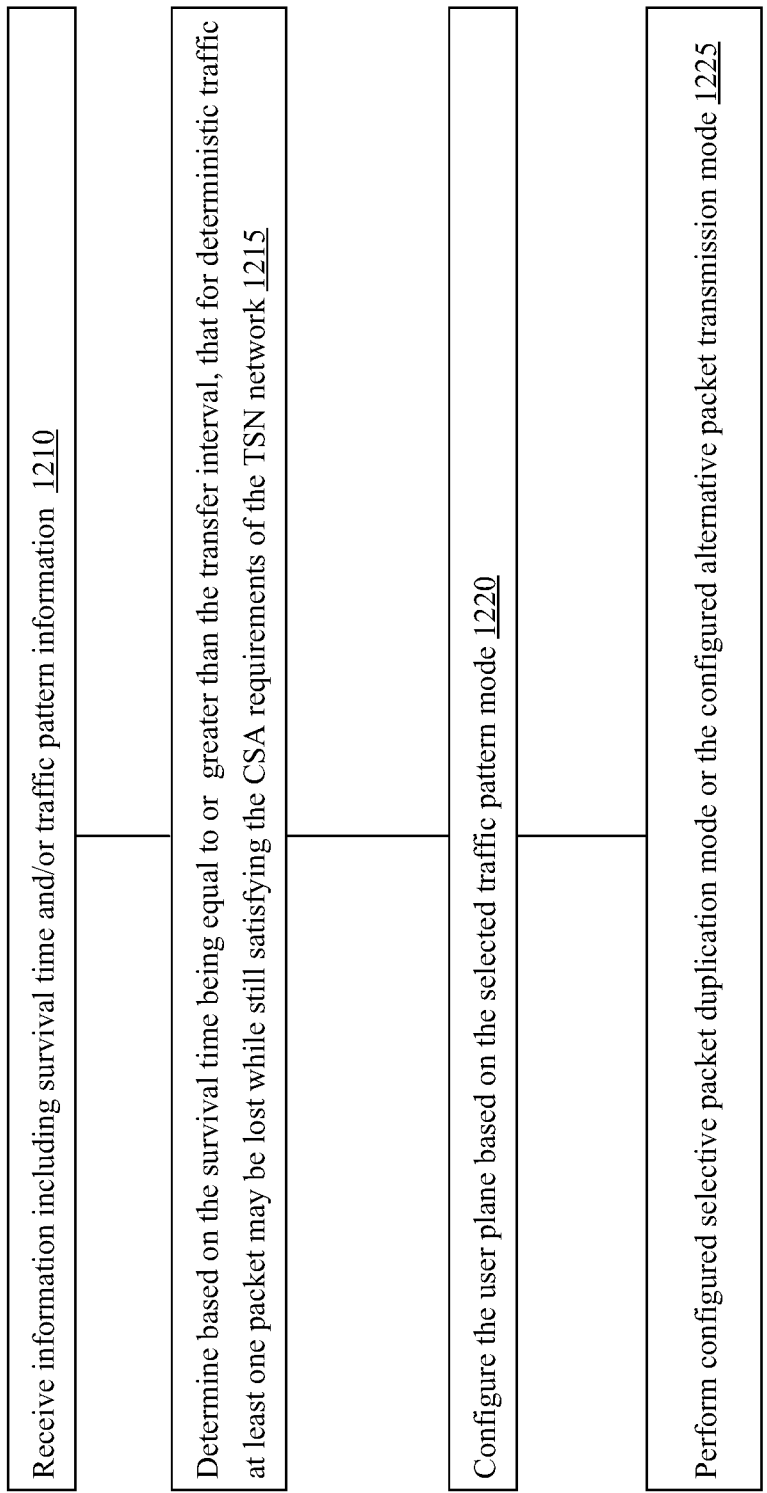
FIG. 12 depicts an example of a process for handling deterministic traffic, in accordance with some example embodiments.

FIG. 12 depicts an example of a process, in accordance with some example embodiments.

At 1210, a node may receive information that may include including survival time and/or traffic pattern information indicative of deterministic traffic, in accordance with some example embodiments. For example, a node, such as a RAN, an SMF, a UE, or other node, may receive information, survival time and/or an indication of the traffic pattern for the deterministic traffic (e.g., full redundancy mode, selective packet transmission mode, and/or alternative packet transmission mode). In some instances, the received information may include additional information as well, such as TSCAI, link quality, QoS information, and/or the like. And, the node may determine, based on the received information, a packet handling type indicative of whether the deterministic traffic is to be carried in a selective packet duplication mode or an alternative packet transmission mode over at least two links.

At 1215, the node may determine based on the survival time being equal to or greater than the transfer interval, that for deterministic traffic at least one packet may be lost while still satisfying the CSA requirements of the TSN network. When this is the case, the node may determine that the indicated traffic pattern, such as selective packet transmission mode and/or alternative packet transmission mode may be selected for carrying deterministic traffic over at least two links. The node may also take into account link quality. For example, if link quality is poor, the node may select full transmission redundancy over the at least two links, rather than selective packet duplication or alternative packet transmission modes.

At 1220, the node may configure the user plane based on the selected traffic pattern mode. For example, when the traffic pattern is selected as selective packet transmission mode, the node may configure the at least two links for this traffic pattern. Likewise, when the traffic pattern is selected as alternative packet transmission mode, the node may configure the at least two links for this traffic pattern. As indicated above, these modes may be configured in the RAN and/or core network.

At 1225, the configured selective packet duplication mode or the configured alternative packet transmission mode may be performed. For example, the traffic may be carried over the at least two link in the core network (e.g., the N3 tunnels) or the RAN (e.g., under carrier aggregation or dual connectivity) using the configured traffic pattern.

Figure 13:
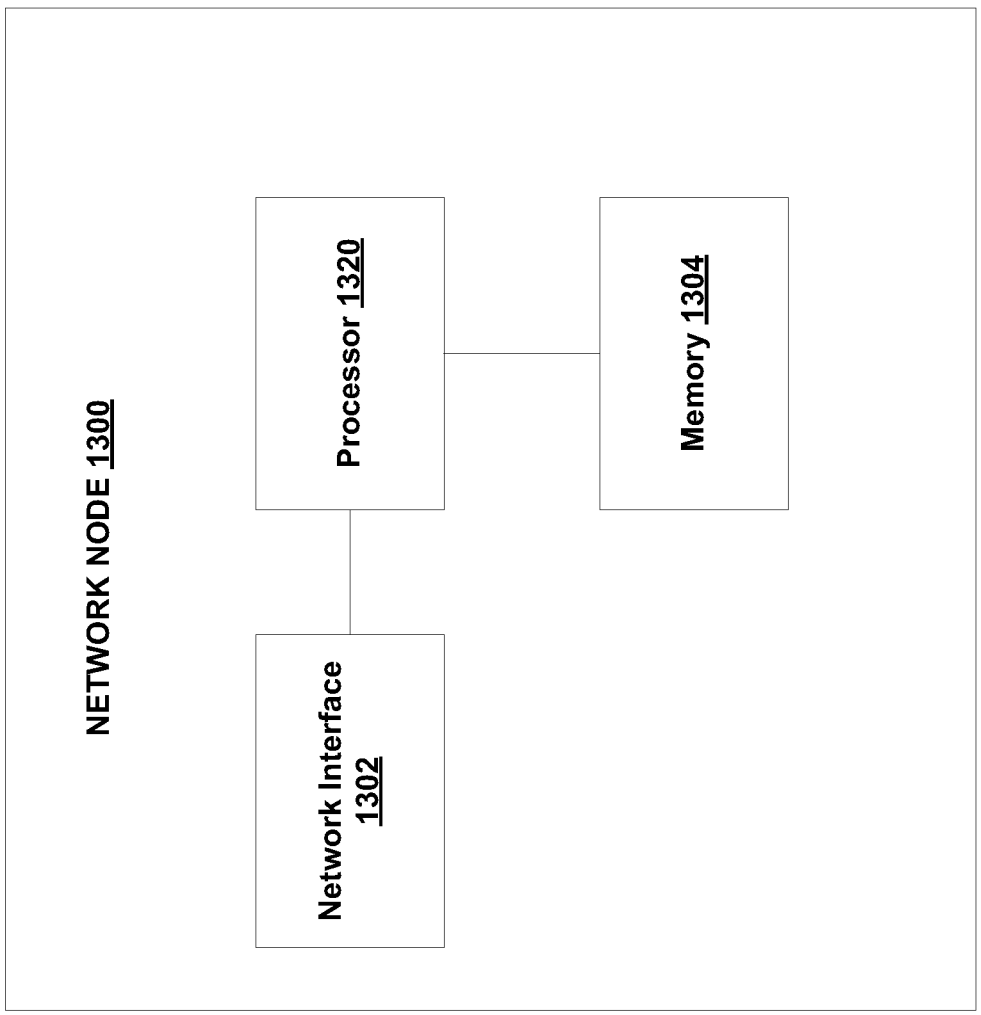
FIG. 13 depicts an example of a network node, in accordance with some example embodiments.

FIG. 13 depicts a block diagram of a network node 1300, in accordance with some example embodiments. The network node 1300 may be configured to provide one or more network side functions, such as a base station (e.g., RAN 170), AMF 172, PCF 180, AF 150, CNC 104, CUC 102, and/or other network nodes.

The network node 1300 may include a network interface 1302, a processor 1320, and a memory 1304, in accordance with some example embodiments. The network interface 1302 may include wired and/or wireless transceivers to enable access other nodes including base stations, devices 152-180, the Internet, and/or other nodes. The memory 1304 may comprise volatile and/or non-volatile memory including program code, which when executed by at least one processor 1320 provides, among other things, the processes disclosed herein with respect to the network node.

Figure 14:
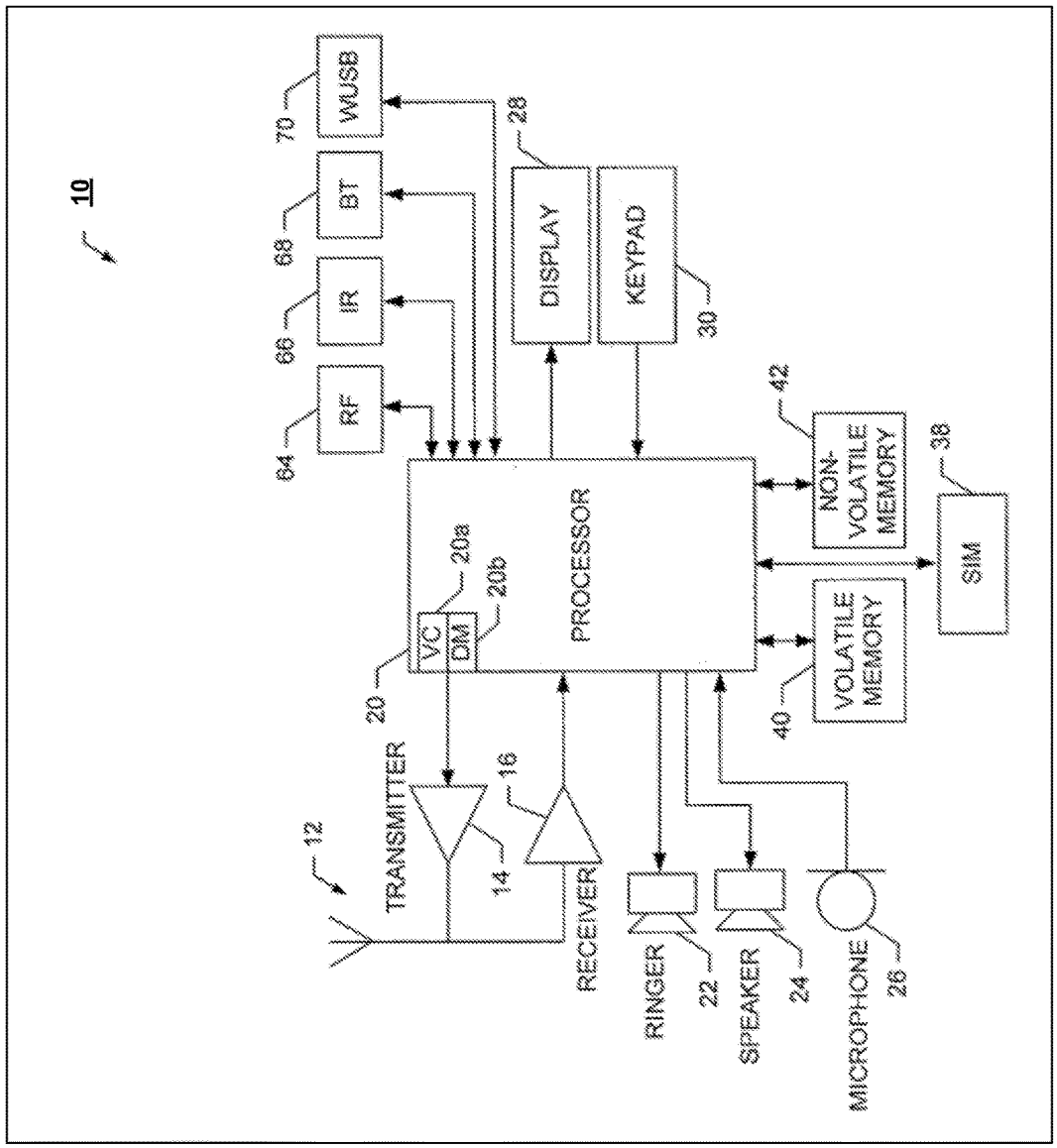
FIG. 14 depicts an example of an apparatus, in accordance with some example embodiments.

FIG. 14 illustrates a block diagram of an apparatus 10, in accordance with some example embodiments.

The apparatus 10 may represent a user equipment, such as the user equipment 164 configured to receive, from a base station, a radio resource reconfiguration message including an indication of whether time sensitive communication traffic is in an alternative packet transmission mode or a selective packet transmission mode and communicate, based on the received indication, with the base station via at least a first link and a second link.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 14 as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 14, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein. Alternatively or additionally, the apparatus may be configured to cause the operations disclosed herein with respect to the base stations/WLAN access points and network nodes including the UEs.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to the provide operations disclosed herein with respect to the UE.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 14, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein may be reduced traffic load compared to full data duplication while still satisfying communication service availability.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined.

Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. An apparatus comprising:
   at least one processor; and
   at least one memory including computer program code, the at least one memory and the computer program code configured to, with the at least one processor, cause the apparatus to at least:
   receive information including survival time, link quality, and traffic pattern information indicative of deterministic traffic;
   receive a set of rules that indicate which traffic pattern should be used based on the received information;
   determine, based on the set of rules, that the link quality is below a link quality threshold;
   determine, based on the received information and the link quality being below the link quality threshold, a packet handling type indicating that the deterministic traffic is to be carried in an alternative packet transmission mode over at least two links, wherein the alternative packet transmission mode comprises alternating transmission or reception over the at least two links, wherein the at least two links are configured across a radio access network in accordance with carrier aggregation or dual-connectivity;
   determine that the survival time exceeds a transfer interval over a wireless network; and
   perform, based on at least on the survival time exceeding the transfer interval over the wireless network, the indicated packet handling type to enable the deterministic traffic to be carried over the at least two links in the alternative packet transmission mode.

2. The apparatus of claim 1, wherein the traffic pattern information comprises time sensitive communication assistance information, wherein the survival time represents a time that an application at an end station operates after a loss of a message.

3. The apparatus of claim 1, wherein the indicated packet handling type is performed, when the survival time is equal to or exceeds the transfer interval over the wireless network.

4. The apparatus of claim 1, wherein the received information is carried by two or more of the following: a radio resource control message, a radio resource control reconfiguration message, a session establishment request, a packet forwarding control protocol message, and a protocol data unit session request.

5. The apparatus of claim 1, wherein the apparatus is further caused to at least determine, based on the survival time being greater than the transfer interval, that, for the deterministic traffic, at least one packet is lost while satisfying a communication service availability for the deterministic traffic.

17

6. The apparatus of claim 5, wherein the apparatus further caused to at least select, for the deterministic traffic being carried over the at least two links the alternative packet transmission mode.

7. The apparatus of claim 1, wherein the indicated packet handling type is performed by at least configuring the at least two links as at least two tunnels over the N3 interface.

8. The apparatus of claim 1, wherein the apparatus comprises or is comprised in a user equipment.

9. The apparatus of claim 1, wherein the deterministic traffic comprises periodic traffic, time sensitive network traffic, and time sensitive communication traffic.

10. A method comprising:
receiving information including survival time, link quality, traffic pattern information indicative of deterministic traffic;
receive a set of rules that indicate which traffic pattern should be used based on the received information;
determine, based on the set of rules, that the link quality is below a link quality threshold;
determining, based on the received information and the link quality being below the link quality threshold, a packet handling type indicating that the deterministic traffic is to be carried in an alternative packet transmission mode over at least two links, wherein the alternative packet transmission mode comprises alternating transmission or reception over the at least two links, wherein the at least two links are configured across a radio access network in accordance with carrier aggregation or dual-connectivity;
determining that the survival time exceeds a transfer interval over a wireless network; and
performing, based on at least on the survival time exceeding the transfer interval over the wireless network, the indicated packet handling type to enable the deterministic traffic to be carried over the at least two links in the alternative packet transmission mode.

11. The method of claim 10, wherein the traffic pattern information comprises time sensitive communication assistance information, and wherein the survival time represents a time that an application at an end station operates after a loss of a message.

12. The method of claim 11, wherein the indicated packet handling type is performed when the survival time is equal to or exceeds a transfer interval over the wireless network.

13. The method of claim 10, wherein the received information is carried by a radio resource control message, a radio resource control reconfiguration message, a session establishment request, a packet forwarding control protocol message, and a protocol data unit session request.

14. The method of claim 10, further comprising determining, based on the survival time being greater than the transfer interval, that, for the deterministic traffic, at least one packet is lost while satisfying a communication service availability for the deterministic traffic.

15. The method of claim 14, further comprising selecting the deterministic traffic to be carried over the at least two links via the alternative packet transmission mode.

16. A user equipment comprising:
at least one processor; and
a memory comprising computer-executable instructions that, when executed by the at least one processor, cause the at least one processor to perform the following operations:
receive information including survival time, link quality, and traffic pattern information indicative of deterministic traffic;
receive a set of rules that indicate which traffic pattern should be used based on the received information;
determine, based on the set of rules, that the link quality is below a link quality threshold;
determine, based on the received information and the link quality being below the link quality threshold, a packet handling type indicating that the deterministic traffic is to be carried in an alternative packet transmission mode over at least two links, wherein the alternative packet transmission mode comprises alternating transmission or reception over the at least two links, wherein the at least two links are configured across a radio access network in accordance with carrier aggregation or dual-connectivity;
determine that the survival time exceeds a transfer interval over a wireless network; and
perform, based on at least on the survival time exceeding the transfer interval over the wireless network, the indicated packet handling type to enable the deterministic traffic to be carried over the at least two links in the alternative packet transmission mode.

17. The user equipment of claim 16, wherein the traffic pattern information comprises time sensitive communication assistance information, and wherein the survival time represents a time that an application at an end station operates after a loss of a message.

18. The user equipment of claim 17, wherein the received information is carried by three or more of the following: a radio resource control message, a radio resource control reconfiguration message, a session establishment request, a packet forwarding control protocol message, and a protocol data unit session request.

19. The user equipment of claim 18, wherein the computer-executable instructions further cause the at least one processor to perform the following operations: determine, based on the survival time being greater than the transfer interval, that, for the deterministic traffic, at least one packet is lost while satisfying a communication service availability for the deterministic traffic.

20. The user equipment of claim 16, wherein the indicated packet handling type is performed by at least configuring the at least two links as at least two tunnels over the N3 interface, and wherein the deterministic traffic comprises periodic traffic, time sensitive network traffic, and time sensitive communication traffic.

\* \* \* \* \*